US00RE40104E

(19) United States
(12) Reissued Patent
Miyaji et al.

(10) Patent Number: US RE40,104 E
(45) Date of Reissued Patent: Feb. 26, 2008

(54) PLASMA DISPLAY PANEL WITH BUS ELECTRODES HAVING BLACK ELECTROCONDUCTIVE MATERIAL

(75) Inventors: Minoru Miyaji, Tokyo (JP); Katsumi Kunii, Tokyo (JP)

(73) Assignee: Mitsubishi Denki Kabushiki Kaisha, Tokyo (JP)

(21) Appl. No.: 10/209,623

(22) Filed: Aug. 1, 2002

Related U.S. Patent Documents

Reissue of:

(64) Patent No.: 6,097,149
Issued: Aug. 1, 2000
Appl. No.: 09/050,006
Filed: Mar. 30, 1998

(30) Foreign Application Priority Data

Mar. 31, 1997 (JP) ..... 09-081050

(51) Int. Cl.
*H01J 17/49* (2006.01)

(52) U.S. Cl. ..... 313/582; 313/583; 313/584; 313/585

(58) Field of Classification Search ..... 313/582, 313/583, 584, 585, 586, 491, 631, 620
See application file for complete search history.

(56) References Cited

U.S. PATENT DOCUMENTS

| | | | | |
|---|---|---|---|---|
| 4,320,418 | A | * | 3/1982 | Pavliscak ..... 348/797 |
| 5,117,761 | A | | 6/1992 | Kasai et al. |
| 5,548,186 | A | | 8/1996 | Ota |
| 5,851,732 | A | | 12/1998 | Kanda et al. |
| 5,977,708 | A | | 11/1999 | Amatsu et al. |
| 6,156,433 | A | | 12/2000 | Hatori et al. |

FOREIGN PATENT DOCUMENTS

| | | |
|---|---|---|
| JP | 53-069057 | 6/1978 |
| JP | 53-082442 | 7/1978 |
| JP | 58-95382 | 6/1983 |
| JP | P61-176035 | 8/1986 |
| JP | 10-40821 | 2/1989 |
| JP | 02-288400 | 11/1990 |
| JP | 03-291827 | 12/1991 |
| JP | 04-245140 | 9/1992 |
| JP | P04-272634 | 9/1992 |
| JP | 05-089772 | 4/1993 |
| JP | 05-325793 | 12/1993 |
| JP | 06-005024 | 1/1994 |
| JP | P07-105855 | 4/1995 |
| JP | 07-130307 | 5/1995 |
| JP | P07-176269 | 7/1995 |
| JP | 08-022128 | 1/1996 |
| JP | 08-087245 | 4/1996 |
| JP | P08-227664 | 9/1996 |

(Continued)

OTHER PUBLICATIONS

Collected Papers, XIV Intl. Congress on Glass, vol. III, New Delhi, India (1986).

*Primary Examiner*—Joseph Williams
(74) *Attorney, Agent, or Firm*—Birch, Stewart, Kolasch & Birch, LLP

(57) ABSTRACT

On a first substrate provided on a display surface of a plasma display panel, bus electrodes (12a, 14a) in X and Y electrode lines (12, 14) forming a pair of display electrode lines are formed with an Ag material containing a black additive ($RuO_2$, etc.) by a screen printing. This prevents external light from being reflected at the surfaces of the bus electrodes (12a, 14a) on the display side of an FP substrate (10) to improve the display contrast. The bus electrodes (12a, 14a) may be formed as a multi-layer structure. In this case, for example, the lower-layer bus electrodes are formed with a black metal material and the upper-layer bus electrodes are formed with a light-reflecting material layer, which improves light utilization efficiency and further improves the contrast.

13 Claims, 4 Drawing Sheets

FOREIGN PATENT DOCUMENTS

| | | |
|---|---|---|
| JP | 09-022656 | 1/1997 |
| JP | 09-050769 | 2/1997 |
| JP | 9-68947 | 3/1997 |
| JP | 10-116558 | 5/1998 |
| JP | 10-241573 | 9/1998 |
| JP | 10-255670 | 9/1998 |
| JP | 10-269951 A | 10/1998 |
| JP | 10-302648 | 11/1998 |
| JP | 2964716 | 8/1999 |

* cited by examiner

PLASMA DISPLAY PANEL WITH BUS ELECTRODES HAVING BLACK ELECTROCONDUCTIVE MATERIAL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a gas-discharge display device, and particularly to a structure for improving display quality of the panel (plasma display panel).

2. Description of the Background Art

FIG. 7 shows plane structure of a common AC-type plasma display panel (PDP).

The PDP forming the panel portion of a gas-discharge display device has a first substrate and a second substrate sealed at sealing portion at the edges with a sealing material formed of frit glass or the like, with a discharge space 22 filled with gas between the two substrates. A plurality of discharge cells are formed in a matrix in the discharge space 22. The discharge cells are individually controlled to discharge or not to discharge to cause phosphors 34 to emit light for display of desired picture.

The fist substrate has a front glass substrate (hereinafter referred to as an FP substrate) 10, on which sustain electrode lines (hereinafter referred to as X electrode lines) 12 and scan/sustain electrode lines (hereinafter referred to as Y electrode lines) 14 forming pairs of display electrode lines are formed like stripes. The X and Y electrode lines 12 and 14 are formed with three-layer structure of Ct/Cu/Cr by photolithography, or formed with Au by screen printing (also called thick-film printing). A dielectric layer 18 is formed almost all over the surface of the FP substrate 10 to cover the X electrode lines 12 and the Y electrode lines 14, and the dielectric layer 18 is covered by a discharge electrode layer 20 formed of MgO (also referred to as a discharge protection layer, hereinafter shown as an MgO layer), which serves as a cathode in discharge.

The second substrate has a rear glass substrate (hereinafter referred to as a BP substrate) 30, on which address electrode lines 32 are formed to extend in a direction perpendicular to the X and Y electrode lines 12 and 14. In the area corresponding to the display area of the PDP, red (R), green (G) and blue (B) phosphors 34 are correspondingly formed on the address electrode lines 32. Further, barrier portions (hereinafter referred to as ribs) 36 are formed by screen printing in intervals between the address electrode lines 32 to prevent optical cross-talk between adjacent address electrode lines 32, or between discharge cells.

The discharge cells are formed at intersections of the address electrode lines 32 and the X and Y electrode lines 12 and 14 extending perpendicular to the address electrode lines 32. Address pulses are applied to the address electrode lines 32, and at the same time, scanning pulses are applied to the Y electrode lines 14 to select discharge cells at the intersections. This causes the discharge cells to discharge (address write discharge) and accumulate wall charge. Subsequently, sustain pulses are applied alternatively to the Y electrode lines 14 and the X electrode lines 12 to produce sustain discharge between the Y electrode lines 14 and the X electrode lines 12 to sustain discharge. The phosphors 34 formed along the address electrode lines 32 are excited by ultra-violet rays produced by gas discharge in discharge cells and generate visible light.

While it is possible to display image by controlling the discharge cells as described above, it is desirable for the display device to make display with higher quality. Making display of good quality requires preventing reflection of external light to improve display contrast of discharge cells in the PDP and further improving the light emission efficiency at discharge cells.

However, it is also essential to reduce the manufacturing cost, while enabling display of good quality. For cost reduction, it is more advantageous to form the layers by screen printing than by thin-film process by photolithography. Accordingly, demanded is a PDP that can be stably formed by screen printing and provide superior display quality.

SUMMARY OF THE INVENTION

According to an aspect of the present invention, a plasma display panel comprises: a first substrate; a second substrate provided to face the first substrate, with a plurality of discharge cells filled with a discharge gas between the first substrate and the second substrate; and a pair of display electrode lines formed on an opposing surface of the first substrate opposing to the second substrate; wherein each of the display electrode lines comprises a transparent electrode formed on the opposing surface of the first substrate, and a bus electrode formed on a surface of the transparent electrode, and wherein the bus electrode comprises a black electroconductive material layer comprising a black electroconductive material and formed on the surface of the transparent electrode.

Preferably, in the plasma display panel of the invention, the black electroconductive material layer is formed by a screen printing method.

Preferably, in the plasma display panel of the invention, the bus electrode further comprises a light-reflecting material layer formed on a surface of the black electroconductive material layer and capable of reflecting visible light.

Preferably, in the plasma display panel of the invention, the black electroconductive material layer and the light-reflecting material layer are both formed by a screen printing method.

Preferably, in the plasma display panel of the invention, the black electroconductive material layer is formed of a first metal material, and the light-reflecting material layer formed by the screen printing method is formed of a second metal material having a particle size smaller than the particle size of the first metal material.

Preferably, in the plasma display panel of the invention, the light-reflecting material layer comprises an uncolored metal material.

Preferably, the plasma display panel of the invention further comprises another pair of display electrode lines adjacent to the pair of display electrode lines and formed on the opposing surface of the first substrate, and a black stripe portion comprising a black dielectric layer and formed on a part of the opposing surface of the first substrate in an interval between the pair of display electrode lines and the other pair of display electrode lines.

Preferably, in the plasma display panel of the invention, the black stripe portion further comprises a first white dielectric layer formed on a surface of the black dielectric layer.

Preferably, in the plasma display panel of the invention, the bus electrode further comprises a second white dielectric layer formed on a surface of the black electroconductive material layer.

Preferably, in the plasma display panel of the invention, the bus electrode further comprises a light-reflecting material layer formed on a surface of the black electroconductive material layer and capable of reflecting visible light.

Preferably, in the plasma display panel of the invention, the black electroconductive material layer is formed by using a silver material comprising a black additive.

Preferably, in the plasma display panel of the invention, the first substrate comprises a soda glass substrate and a coating formed on an off-tin surface of the soda glass substrate, wherein a surface of the coating forms the opposing surface of the first substrate.

Preferably, the plasma display panel of the invention further comprises a dielectric formed to cover the pair of display electrode lines and the opposing surface of the first substrate, wherein the dielectric omprises a plurality of dielectric layers having different softening points.

Preferably, in the plasma display panel of the invention, an arbitrary one of the plurality of dielectric layers has a first softening point higher than a second softening point of an upper one of the dielectric layers provided above the arbitrary dielectric layer.

Preferably, in the plasma display panel of the invention, the plurality of dielectric layers are formed by a screen printing method.

According to another aspect of the present invention, a plasma display panel comprises: a first substrate; a second substrate provided to face the first substrate, with a plurality of discharge cells filled with a discharge gas between the first substrate and the second substrate; a pair of display electrode lines formed on an opposing surface of the first substrate opposing to the second substrate; and a dielectric formed to cover the pair electrode lines and the opposing surface of the first substrate; wherein the dielectric comprises a plurality of dielectric layers having different softening points.

Preferably, in the plasma display panel of the invention, an arbitrary one of the plurality of dielectric layers has a first softening point higher than a second softening point of an upper one of the dielectric layers provided above the arbitrary dielectric layer.

Preferably, in the plasma display panel of the invention, the dielectric comprises a lower-layer dielectric layer formed to cover the pair of display electrode lines and the opposing surface of the first substrate and having the first softening pint set around a firing temperature for the dielectric, and an upper-layer dielectric layer formed on a surface of the lower-layer dielectric layer and having the second softening point lower than the firing temperature and lower than the first softening point.

According to still another aspect of the present invention, in a substrate for use in a plasma display panel, a transparent electrode and a bus electrode are formed in order like stripes on a first part of a main surface of the substrate, and the bus electrode comprises a black electroconductive material layer comprising a black electroconductive material.

Preferably, in the substrate of the invention, a dielectric is formed to cover a second part of the main surface of the substrate, the transparent electrode and the bus electrode, wherein the dielectric comprises a plurality of dielectric layers with different softening points.

According to the present invention, the formation of the bus electrodes in a pair of display electrodes with a black electroconductive material prevents light produced in adjacent discharge cells from leaking and also prevent external light from being reflected on the surfaces of the bus electrodes on the side of the display face of the display, thus improving the display contrast.

When the black bus electrodes are formed by a screen printing, the manufacturing cost can be reduced. Further, forming multi-layer bus electrodes in a plurality of times of printing processes prevents disconnection of the electrodes and reduces the resistance.

Furthermore, according to the present invention, the bus electrodes are formed as a multi-layer structure, with a lower-layer bus electrode, which is provided on the transparent electrode side, formed by using a black electroconductive material and an upper-layer bus electrode formed by using a light-reflecting material. Forming the lower-layer bus electrode with a black electroconductive material improves the contrast and forming the upper-layer bus electrode with a light-reflecting material improves the efficiency of utilization of light emitted from the phosphors, thus further improving the display quality.

Moreover, according to the present invention, an uncolored metal material or a white dielectric material is used as the light-reflecting material layer, which efficiently reflects the light emitted from the phosphors.

When a black dielectric layer is provided between a pair of display electrode lines and another, adjacent pair of display electrode lines, the display contrast can be further improved. Further, when a light-reflecting material, e.g., white dielectric layer is formed on an opposing surface of the black dielectric layer opposing to the second substrate, the light utilizing efficiency in discharge cells is enhanced, resulting in further improved display contrast.

When Ag is used as a material of the bus electrodes and Ag containing a black additive is used as the black electroconductive material, it is possible to form low-resistance electrodes. In this case, forming the display electrode lines on the off-tin surface side of a soda glass substrate prevents discoloration of the substrate and electrodes due to diffusion of the electrode material Ag.

Moreover, in the present invention, the dielectric layer formed on the display electrode lines has a multi-layer structure, wherein a dielectric layer having a high softening point if formed as its lower layer. For example, when the softening point is set around the firing temperature for the dielectric layer, the dielectric layer does not completely melt when the lower-layer dielectric layer is fired, which prevents diffusion of the bus electrode line material into the dielectric layer and prevents disconnection. An upper-layer dielectric layer is formed as a dielectric layer with a low softening point. For example, when the softening point is set so that the dielectric layer sufficiently melts when the upper-layer dielectric layer is fired, the surface of the dielectric layer on the side opposing to the second substrate can be provided as a smooth surface.

The present invention has been made to solve the problems described above, and it is an object of the present invention to obtain a plasma display panel with superior display quality.

These and other objects, features, aspects and advantages of the present invention will become more apparent from the following detailed descriptions of the present invention when taken in conjunction with the accompanying drawings.

DESCRIPTION OF THE PREFERRED EMBODIMENTS

Figure 1:
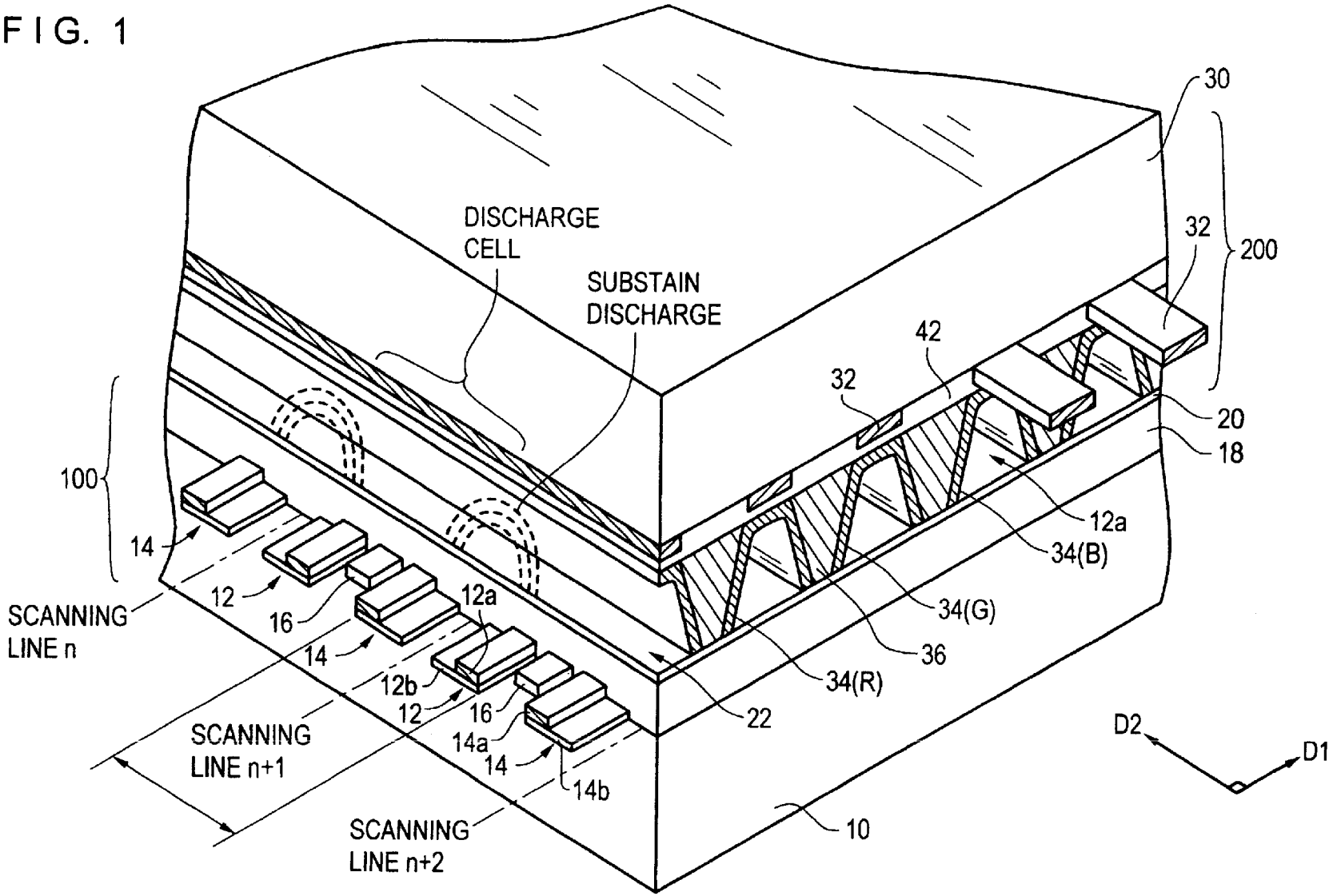
FIG. 1 is a schematic diagram showing the structure of a plasma display according to a first preferred embodiment of the present invention.

Preferred embodiments of the present invention will now be described referring to the drawings.

First Preferred Embodiment an AC-type plasma display panel (hereinafter referred to as a PDP) forming the panel portion of a gas-discharge display device has a first substrate and a second substrate sealed at the sealing portions at the edges with a sealing material such as frit glass, with the gap between the two filled with a gas.

FIG. 1 schematically shows the structure of the display area of a PDP according to the first preferred embodiment.

In FIG. 1, a front panel or first panel 100 has a front glass substrate (hereinafter referred to as an FP substrate) 10, on which sustain electrode lines (hereinafter referred to as X electrode lines) 12 and scan/sustain electrode lines (hereinafter referred to as Y electrode lines) 14 forming pairs of display electrode lines are formed like stripes.

The X electrode lines 12 and the Y electrode lines 14 are formed of transparent electrodes 12b, and 14b and bus electrodes 12a, 14a formed on a first portion of the opposing surface or main surface of the first substrate that will be defined later. The transparent electrodes 12b, 14b are formed with an indium-tin oxide ITO, for example, on the FP substrate 10 by photolithography, or screen printing, or the like. The bus electrodes 12a, 14a are composed of a black and electrically conductive material, more specifically, a black and low-resistance metal material (e.g., Ag, Au containing a black colorant), which are formed by screen printing (also referred to as thick-film printing) on the transparent electrodes 12b, 14b. These X electrode lines 12 and Y electrode lines 14 are formed in the same process by screen printing, for example. A pair of the X electrode line 12 and the Y electrode line 14 corresponds to one scanning line (e.g., the scanning line n, the scanning line n+1, the scanning line n+2). Black stripes (hereinafter referred to as BS) 16 forming a black dielectric layer are formed between the scanning lines (e.g., between the Y electrode line 14 for the scanning line n and the X electrode line 12 for the scanning line n+1). The BSs 16 are formed of a dielectric material to prevent cross-talk of light emission on adjacent scanning lines to improve the contrast.

A dielectric layer (also referred to as a dielectric) 18 is formed almost all over the FP substrate 10 (on a second portion of the main surface excluding the first portion and the area on which the BSs 16 are formed) to cover the X electrode lines 12, the Y electrode lines 14, and the BSs 16. A discharge electrode layer 20 of MgO (hereinafter referred to as a protection film) is formed by sputtering or deposition to cover the dielectric layer 18, which serves as a cathode in gas discharge and also as a protection film for the dielectric layer 18.

The rear panel or second panel 200 has a rear glass substrate (hereinafter referred to as a BP substrate) 30, on which address electrode lines 32 are formed to extend in the direction D2 normal to the direction D1 in which the X and Y electrode lines 12 and 14 are arranged. A white glaze layer 42, or a white dielectric layer, is formed almost all over the BP substrate 30 to cover the address electrode lines 32 for the purpose of improving the luminance of the panel. Barrier ribs 36 are formed on the white glaze layer 42 in the intervals between the address electrode lines 32, which prevent optical cross-talk between adjacent ones of the address electrode lines 32, i.e., between discharge cells.

Phosphors 34 are formed on the surface of the white glaze layers 42 facing the address electrode lines 32 and on the wall surfaces of the barrier ribs 36 corresponding to the address electrode lines.

In the display area of the PDP, a plurality of discharge cells are formed in a matrix at intersections of the address electrode lines 32 and the X electrode lines 12 and the Y electrode lines 14 perpendicular to the address electrode lines 32. Address pulses are applied to the address electrode lines 32 and scan pulses are applied to the Y electrode lines 14 that can be individually driven for the respective scanning lines to thereby select desired discharge cells and accumulate wall charge in the MgO layer 20. After wall charge has been accumulated, sustain pulses are alternatively applied to the X electrode lines 12 formed as common electrode on the panel and the Y electrode lines 14 to thereby produce sustain discharge between the Y electrode lines 14 and the X electrode lines 12 to sustain discharge, as shown by the dotted lines in FIG. 1. In the first preferred embodiment, with red (R), green (G) and blue (B) phosphors 34 arranged like stripes as shown in FIG. 1, the discharge cells are individually controlled to discharge or not to discharge to cause the phosphors 34(R), 34(G), 34(B) to emit light to obtain color picture in the entire screen.

In the above-described structure, in the first preferred embodiment, an Ag material containing a black additive ($RuO_2$, for example) is used as the bus electrodes 12a, 14a, as stated above. Accordingly the bus electrodes 12a and 14a present a black tone.

In an AC-type PDP, the FP substrate 10 is on the side of the display face. Visible light emitted from the phosphors 34 passes through the transparent electrodes 12b, 14b to make display with light emission in the discharge cells. On the other hand, the area where the bus electrodes 12a, 14a are formed does not take part in the light emission display. The same is true for the intervals between adjacent scanning lines. If light leaks through the bus electrodes 12a, 14a and the intervals between the scanning lines or external light is reflected on the bus electrodes 12a, 14a or the intervals between the scanning lines, the display contrast is reduced. Therefore the BSs 16 are formed between the scanning lines to shield the intervals, with a black color. Furthermore, the black bus electrodes 12a, 14a prevent external light from the display side of the FP substrate 10 from being reflected on the surfaces of the bus electrodes 12a, 14a, thus improving the display contrast. While the black bus electrodes 12a, 14a can be formed by screen printing with reduced manufacturing cost, they may be formed by using photolithography. In any case, the bus electrodes are formed by using a metal material containing a black additive.

A soda glass substrate is used as the FP substrate 10. The soda glass substrate is generally formed by a float method in which molten glass is poured out on molten tin. A glass substrate formed by the float method presents a smooth surface like a polished surface on the tin surface 10SB (also referred to as a bottom surface) that is brought in contact with the molten tin. If the bus electrodes 12a, 14a are formed by using Ag over the tin surface 10SB, Ag is apt to diffuse into the substrate to discolor it to yellowish brown.

Accordingly, in the first preferred embodiment, the Ag bus electrode 12a, 14a are formed over the off-tin surface 10ST (also referred to as a top surface) that is not brought into contact with molten tin so as to prevent discoloration adversely affecting the quality. Further, for the purpose of more certainly presenting diffusion of Ag into the substrate, a coating of a silicon oxide $SiO_2$ is formed by sputtering or CVD and the like all over the off-tin surface 10ST of the FP substrate 10 (corresponding to the film 35 in FIG. 2).

Figure 2:
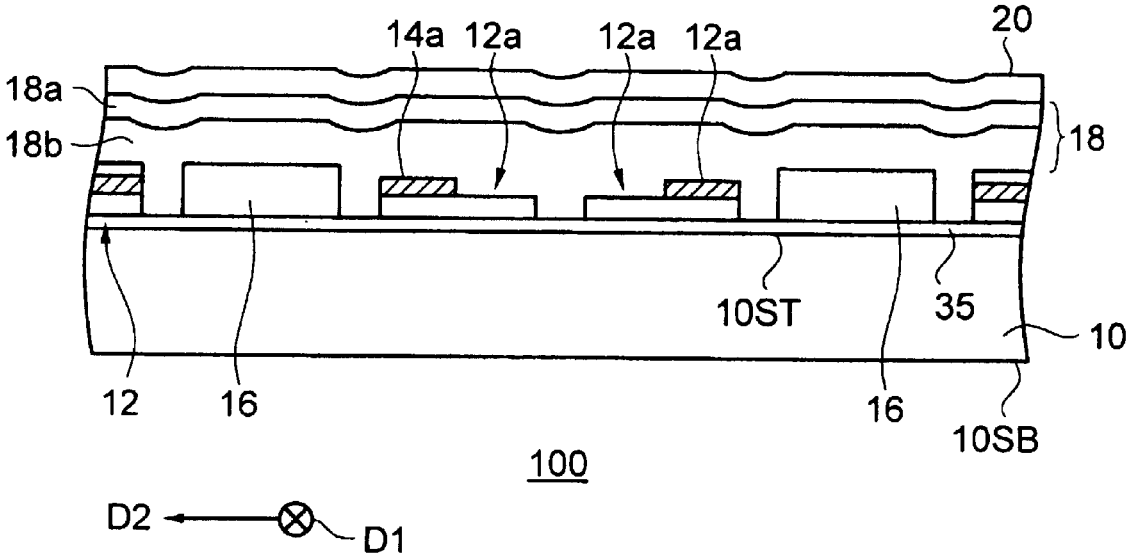
FIG. 2 is a schematic diagram showing a cross-sectional structure of the first substrate part of the plasma display according to the first preferred embodiment.

The FP substrate 10 and the coating 35 shown in FIG. 2 are referred to as a "first substrate" as a whole. In this case, the surface of the coating 35 corresponds to the opposing surface of the first substrate. In correspondence with the general name, the BP substrate 30 is referred to as a "second substrate" as a whole.

FIG. 2 more fully shows the cross-sectional structure of the first substrate 100 of the first preferred embodiment. As shown in FIG. 2, in the first preferred embodiment, a black Ag material is used as the bus electrodes 12a, 14a, and a multi-layer (e.g., two-layer) structure is used as the dielectric layer 18 formed thereon. While lead glass system or bismuth system glass can be used as the principal component of the dielectric layer 18 for example, a glass material with a relatively high softening point (an example of composition: PbO (60 to 65 w %), $B_2O_3$ (1 to 5 w %), $SiO_2$ (25 to 30 w %), $Al_2O_3$ (1 to 5 w %), ZnO (1 to 5 w %)) is used for the lower-layer dielectric layer 18b on the side of the bus electrodes 12a, 14a. Used for the upper-layer dielectric layer 18a is a glass material having a relatively low softening point (an example of composition: PbO (60 to 65 w %), $B_2O_3$ (10 to 15 w %), $SiO_2$ (10 to 15 w %), $Al_2O_3$ (1 to 5 w %), ZnO (1 to 5 w %)). While the compositions of the glass are not limited to those recited above, the softening point of glass can be set lower by including constituents with lower oxygen-metal bond strength (e.g., $B_2O_3$) at a higher compounding ratio and can be set higher by including constituents with high oxygen-metal bond strength at a higher compounding ratio.

The softening point of the lower-layer dielectric layer 18b formed by a screen printing method is set around the firing temperature for the dielectric layer 18b, more specifically, higher by about 10° C. than the firing temperature for the Ag bus electrodes 12a, 14a (generally 550° C.) formed by screen printing, for example. The lower-layer dielectric layer 18b is fired under the same conditions as the Ag bus electrodes 12a, 14a. When the firing temperature and the softening point of the lower-layer dielectric layer 18b is not completely softened, or melted, in the process of firing the lower-layer dielectric layer 18b. If the dielectric layer 18 completely melts when fired with the bus electrodes 12a, 14a formed of Ag, Af will diffuse into the dielectric layer 18 to possibly cause disconnection or inferior breakdown voltage of the bus electrodes. Accordingly, the softening point of the lower-layer dielectric layer 18b is set high so that the lower-layer dielectric layer 18b will not completely melt when it is fired, thus preventing diffusion of Ag.

On the other hand, the softening point of the upper-layer dielectric layer 18a formed by screen printing is set at a temperature sufficiently lower than the firing temperature for the upper-layer dielectric layer 18b, e.g., around 500° C. It is thus set so that the glass material sufficiently melts when fired around 550° C. The upper-layer dielectric layer 18a has the characteristics that the glass is fluidized at a temperature higher than the sealing temperature at the sealing portion (about 450° C.).

Since the protection film 20 is formed on the upper-layer dielectric layer 18a, its surface is required to be smooth. Hence, the softening point of the upper-layer dielectric layer 18a is set lower so that the upper-layer dielectric layer 18a sufficiently melts when it is fired and presents higher smoothness on the surface. A sealing material is applied on the upper-layer dielectric layer 18a at the edges of the panel in the gap between the opposing BP substrate 30 and it. The upper-layer dielectric layer 18a is exposed to the thermal process of sealing with the sealing material. Hence, if the upper-layer dielectric layer 18a is fluidized in the thermal process for sealing, the protection film 20 is liable to be cracked in the vicinity of that area to possibly cause inferior discharge. Accordingly, a material that is not fluidized at the sealing temperature is selected for the upper-layer dielectric layer 18a to avoid the problem.

Such a dielectric layer as has a multi-layer structure in which the softening point of the lower layer is set high and the softening point of the upper layer is set low is effective in forming a stable dielectric layer not only when Ag is used as the bus electrodes (here, including not only black silver but also materials containing Ag as principal component, such as pure Ag and silver palladium (AgPd) but also when a metal material with low heat-resisting temperature (for example, pure Al or a two-layer structure of Cr and Al) is used as the bus electrodes. That is to say, since the temperature of the electrodes and the dielectric layer is elevated by re-firing in the processes of firing the dielectric layer 18 and the protection film 20 formed over the electrodes after the formation thereof, the firing temperature for the upper layer must be set around the firing temperature for the formation of the electrodes. It is necessary under such conditions to maintain the smoothness on the surface of the dielectric layer 18 while preventing diffusion of the electrode material. While it is difficult to satisfy such conditions in the case of a single dielectric layer 18, the use of a dielectric layer 18 having multiple layers with different softening points easily satisfies these conditions.

The coating 35 shown in FIG. 2 is not necessarily required. The electrode lines 12, 14 and the BSs 16 may be formed directly on the off-tin surface 10ST of the FP substrate 10 composed of a soda glass substrate. In this case, the FP substrate 10 corresponds to the "first substrate" and the off-tin surface 10ST corresponds to the opposing surface of the first substrate.

The coating 35 may be formed locally, e.g., only in the areas for formation of the electrode lines 12, 14 on the off-tin surface 10ST, instead of being formed all over the off-tin surface 10ST as shown in FIG. 2.

Second Preferred Embodiment

Figure 3:
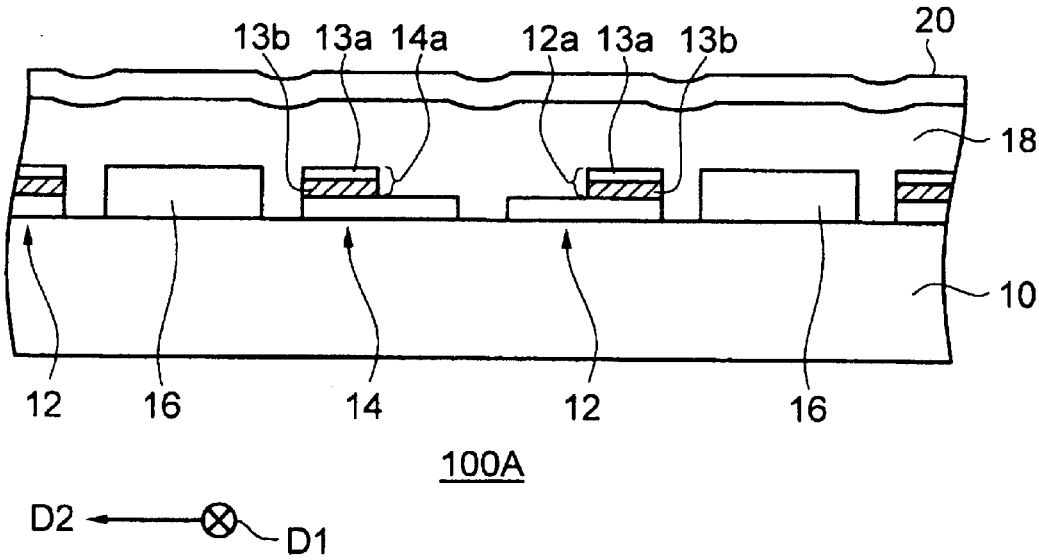
FIG. 3 is a schematic diagram showing a cross-sectional structure of the first substrate part of a plasma display according to a second preferred embodiment.

FIG. 3 shows the structure of a first substrate 100A of a second preferred embodiment. In the second preferred embodiment, a multi-layer structure (e.g., a two-layer structure) is used as the bus electrodes 12a, 14a, where a black metal material (e.g., Ag with a black additive material mixed therein) is used for the lower-layer bus electrodes 13b, similarly to the first preferred embodiment. The upper-layer bus electrodes 13a are light-reflecting material layers formed by using a light-reflecting material. In other respects, the structure and the materials are the same as those in the first preferred embodiment. FIG. 3 does not show the coating 35 shown in FIG. 2. (The same is true in FIG. 4 to FIG. 5).

For the light-reflecting material, white or metallic-luster uncolored metal material containing no black additive (pure Ag, pure Au, etc.) can be applied. The upper-layer bus electrodes 13a substantially face the phosphors 34 on the second substrate side shown in FIG. 1, for the dielectric layer 18 and the MgO layer 20 are transparent. Accordingly, the use of a material reflecting light (visible light) emitted from the phosphors 34 for the upper-layer bus electrodes 13a improves the efficiency of utilization of light, resulting in improved light emission efficiency and improved contrast. Since pure Ag and pure Au containing no coloring material provides high visible light reflectivity, it is possible to efficiently reflect the visible light emitted from the phosphors 34 without absorption. The lower-layer bus electrodes 13b are made black, as in the first preferred embodiment, to provide improved display contrast on the display side.

Further, forming the bus electrodes 12a, 14a with a two-layer structure of metal materials prevents disconnection and lowers the resistance. Moreover, the upper-layer bus electrodes 13a and the lower-layer bus electrodes 13b can be formed by using the same printing screen, and it is possible to more certainly prevent disconnection of the bus electrodes 12a, 14a when the double layers of electrodes 13b, 13a are printed while somewhat shifted in the longitudinal direction of the electrode pattern in printing.

Used as the metal materials for the upper and lower bus electrodes 13a, 13b formed by screen printing are materials having small mean particle size (e.g., Ø=about 0.5 μm), for example. Particularly, a metal material with finer particle size is used for the upper-layer bus electrodes 13a to improve the smoothness on the electrode surface to prevent disconnection and to enhance stability of the dielectric layer 18 on them. The use of finer particle size also enhances the visible light reflectivity. Accordingly, with a (first) metal material for the lower-layer bus electrodes 13b, a (second) metal material having finer particle size than the (first) metal material is used for the upper-layer bus electrodes 13a, which contributes to further improvement of the contrast.

Third Preferred Embodiment

Figure 4:
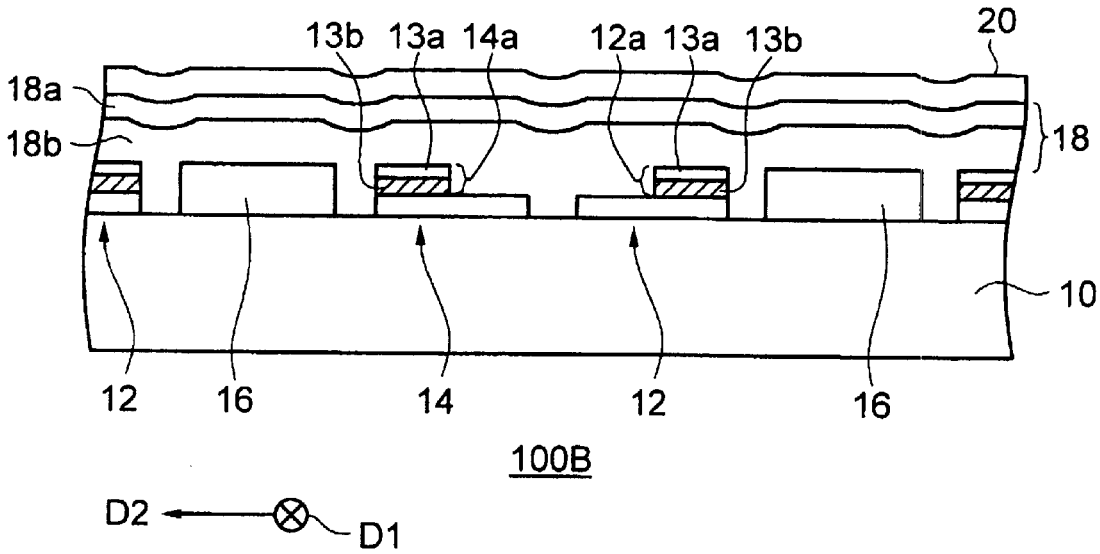
FIG. 4 is a schematic diagram showing a cross-sectional structure of the first substrate part of a plasma display according to a third preferred embodiment.

A first substrate 100B may be formed with a combination of the multi-layer dielectric layer 18 shown in FIG. 2 and the multi-layer bus electrodes 12a, 14a shown in FIG. 3 (refer to FIG. 4). As has been stated above, forming the bus electrodes with a plurality of layers improves the effect of preventing disconnection of the electrodes. Especially, when the multi-layers of black Ag are formed in multiple times of screen printing processes, disconnection can be more certainly prevented by printing the lower-layer Ag layer and the upper-layer Ag layer while somewhat shifted in the longitudinal direction of the electrode pattern.

Fourth Preferred Embodiment

Figure 5:
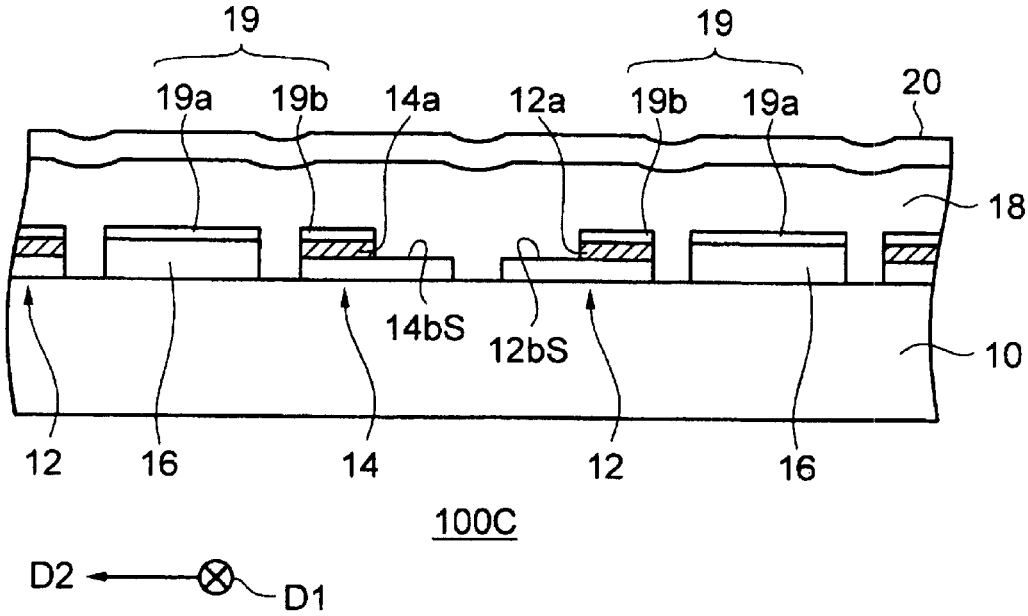
FIG. 5 is a schematic diagram showing a cross-sectional structure of the first substrate part of a plasma display according to a fourth preferred embodiment.

FIG. 5 shows a cross-sectional structure of a first substrate 100C according to a fourth preferred embodiment. In other respects, its structure is the same as that of the above-described first preferred embodiment.

In the fourth preferred embodiment, (first) white dielectric layers 19a are formed by using a white dielectric material having a high light reflectivity, on upper surfaces of the BSs 16 facing the second structure 200, so as to further enhance the light utilization efficiency. Similarly, (second) white dielectric layers 19b are formed as upper layers of the bus electrodes 12a, 14a. The formation of the white dielectric layer 19 on the surface facing the second substrate 200 except on the surfaces 12bS, 14bS of the transparent electrodes reflects the visible light from the phosphors 34 and enhances the light utilization efficiency. The white dielectric layers 19b can be formed by using the same printing screen as the bus electrodes after the formation of the bus electrodes 12a, 14a. Similarly, the white dielectric layer 19a can be formed by using the printing screen for the BSs 16 after the formation of the BSs 16. Alternatively, they may be formed by using a printing screen intended exclusively for the white dielectric layer.

The BSs 16 and the white dielectric layer 19a are defined as a "black stripe portion" as a whole herein.

The bus electrodes 12a, 14a are formed by using a black electrode material (e.g., Ag etc. with a black additive material mixed therein), as described in the first preferred embodiment, or formed as a plurality of layers as described in the second preferred embodiment.

Figure 6:
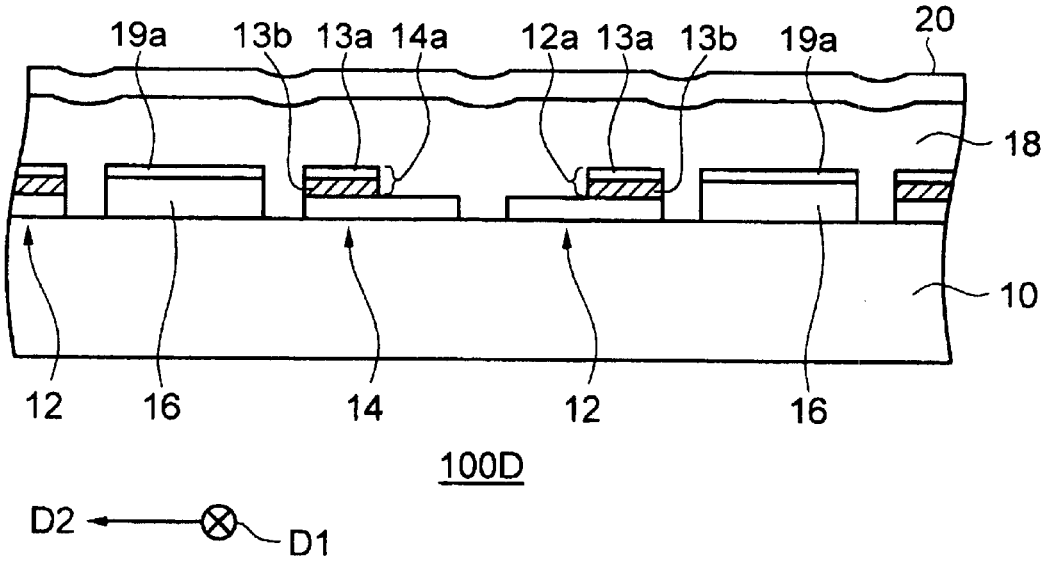
FIG. 6 is a schematic diagram showing a cross-sectional structure of the first substrate part of a plasma display according to a modification of the fourth preferred embodiment.
Figure 7:
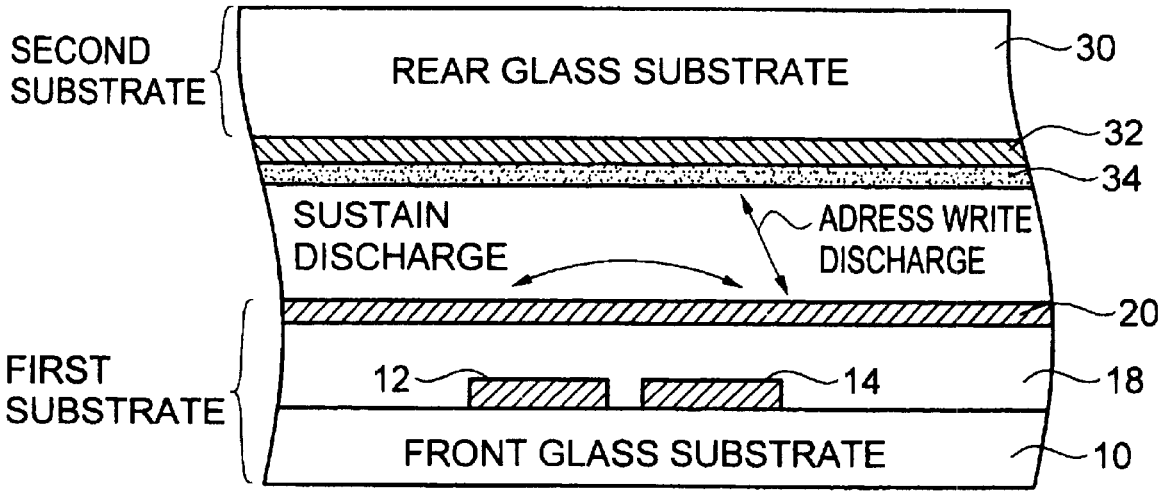
FIG. 7 (PRIOR ART)
FIG. 7 is a diagram showing basic structure of an AC-type plasma display.

When the light-reflecting material layers 13a shown in FIG. 3 are used as the upper layers of the bus electrodes 12a, 14a as described in the second preferred embodiment, it is not essential to form the white dielectric layers 19b shown in FIG. 5 on the bus electrodes 12a, 14a. In this case, as shown in FIG. 6 as a first substrate 100D, with the first light-reflecting material layers 13a as the upper layers of the bus electrodes 12a, 14a, the white dielectric layers 19a are formed as second light-reflecting material layers only on the surfaces of the BSs 16. Further, the dielectric layer 18 of the first substrate 100D in FIG. 6 may be formed with the multi-layer structure shown in FIG. 2.

While the invention has been described in detail, the foregoing description is in all aspects illustrative and not restrictive. It is understood that numerous other modifications and variations can be devised without departing from the scope of the invention.

We claim:

[1. A plasma display panel comprising:

a first substrate;

a second substrate provided to face said first substrate, with a plurality of discharge cells filled with a discharge gas between said first substrate and said second substrate; and a pair of display electrode lines formed on an opposing surface of said first substrate opposing to said second substrate;

wherein each of said display electrode lines comprises a transparent electrode formed on said opposing surface of said first substrate, and a bus substrate formed on a surface of said transparent electrode, and wherein said bus electrode comprises a black electroconductive material layer comprising a black electroconductive material and formed on said surface of said transparent electrode.]

[2. The plasma display panel according to claim 1, wherein said black electroconductive material layer is formed by a screen printing method.]

[3. The plasma display panel according to claim 1, wherein said bus electrode further comprises a light-reflecting material layer formed on a surface of said black electroconductive material layer and capable of reflecting visible light.]

[4. The plasma display panel according to claim 3, wehrein said black electroconductive material layer and said light-reflecting material layer are both formed by a screen printing method.]

5. [The plasma display panel according to claim 4], *A plasma display panel comprising:*

*a first substrate;*

*a second substrate provided to face said first substrate, with a plurality of discharge cells filled with a discharge gas between said first substrate and said second substrate; and*

*a pair of display electrode lines formed on an opposing surface of said first substrate opposing to said second substrate, wherein each of said display electrode lines comprises:*

*a transparent electrode formed on said opposing surface of said first substrate, and*

*a bus electrode formed on a surface of said transparent electrode, wherein said bus electrode comprises:*

*a black electroconductive material layer comprising a black electroconductive material and formed on said surface of said transparent electrode, and*

*a light-reflecting material layer formed on a surface of said black electroconductive material layer and capable of reflecting visible light,*

*wherein said black electroconductive material layer and said light-reflecting material layer are both formed by a screen printing method, and* wherein said black electroconductive material layer is formed of a first metal material, and said light-reflecting material layer formed by said screen printing method is formed of a second metal material having a particle size smaller than the particle size of said first metal material.

[6. The plasma display panel according to claim 3, wherein said light-reflecting material layer comprises an uncolored metal material.]

[7. The plasma display panel according to claim 1, further comprising, another pair of display electrode lines adjacent to said pair of display electrode lines and formed on said opposing surface of said first substrate, and a black stripe portion comprising a black dielectric layer and formed on a part of said opposing surface of said first substrate in an interval between said pair of display electrode lines and said anther pair of display electrode lines.]

8. [The plasma display panel according to claim 7]*A plasma display panel comprising:*

*a first substrate;*

*a second substrate provided to face said first substrate, with a plurality of discharge cells filled with a discharge gas between said first substrate and said second substrate;*

*a pair of display electrode lines formed on an opposing surface of said first substrate opposing to said second substrate;*

*wherein each of said display electrode lines comprises:*

*a transparent electrode formed on said opposing surface of said first substrate, and*

*a bus electrode formed on a surface of said transparent electrode, and wherein said bus electrode comprises a black electroconductive material layer comprising a black electroconductive material and formed on said surface of said transparent electrode;*

*another pair of display electrode lines adjacent to said pair of display electrode lines and formed on said opposing surface of said first substrate; and*

*a black stripe portion comprising a black dielectric layer and formed on a part of said opposing surface of said first substrate in an interval between said pair of display electrode lines and said anther pair of display electrode lines*, wherein said black stripe portion further comprises a first white dielectric layer formed on a surface of said black dielectric layer.

9. The plasma display panel according to claim 8, wherein said bus electrode further comprises a second white dielectric layer formed on a surface of said black electroconductive material layer.

10. The plasma display panel according to claim 8, wherein said bus electrode further comprises a light-reflecting material layer formed on a surface of said black electroconductive material layer and capable of reflecting visible light.

[11. The plasma display panel according to claim 1, wherein said black electroconductive material layer is formed by using a silver material comprising a black additive.]

12. [The plasma display panel according to claim 11]*A plasma display panel comprising:*

*a first substrate;*

*a second substrate provided to face said first substrate, with a plurality of discharge cells filled with a discharge gas between said first substrate and said second substrate;*

*a pair of display electrode lines formed on an opposing surface of said first substrate opposing to said second substrate;*

*wherein each of said display electrode lines comprises:*

*a transparent electrode formed on said opposing surface of said first substrate, and*

*a bus electrode formed on a surface of said transparent electrode, and wherein said bus electrode comprises a black electroconductive material layer comprising a black electroconductive material and formed on said surface of said transparent electrode;*

*wherein said black electroconductive material layer is formed by using a silver material comprising a black additive,* wherein said first substrate comprises a soda glass substrate and a coating formed on an off-tin surface of said soda glass substrate, *and* wherein a surface of said coating forms said opposing surface of said first substrate.

[13. The plasma display panel according to claim 1, further comprising a dielectric formed to cover said pair of display electrode lines and said opposing surface of said first substrate, wherein said dielectric comprises a plurality of dielectric layers having different softening points.]

[14. The plasma display panel according to claim 13, wherein an arbitrary one of said plurality of dielectric layers has a first softening point higher than a second softening point of an upper one of said dielectric layers provided above said arbitrary dielectric layer.]

[15. The plasma display panel according to claim 13, wherein said plurality of dielectric layers are formed by a screen printing method.]

[16. A plasma display panel comprising:

a first substrate;

a second substrate provided to face said first substrate, with a plurality of discharge cells filled with a discharge gas between said first substrate and said second substrate;

a pair of display electrode lines formed on an opposing surface of said first substrate opposing to said second substrate; and a dielectric formed to cover said pair of display electrode lines and said opposing surface of said first substrate;

wherein said dielectric comprises a plurality of dielectric layers having different softening points.]

[17. The plasma display panel according to claim 16, wherein an arbitrary one of said plurality of dielectric layers has a first softening point higher than a second softening point of an upper one of said dielectric layer provided above said arbitrary dielectric layer.]

[18. The plasma display panel according to claim 17, wherein said dielectric comprises a lower-layer dielectric layer formed to cover said pair of display electrode lines and said opposing surface of said first substrate and having said first softening point set around a firing temperature for said dielectric, and an upper-layer dielectric layer formed on a surface of said lower-layer dielectric layer and having said second softening point lower than said firing temperature and lower than said first softening point.]

[19. A front panel for use in a plasma display panel, wherein a transparent electrode and a bus electrode are formed in order like stripes on a first part of a main surface of a substrate, and said bus electrode comprises a black electroconductive material layer comprising a black electroconductive material.]

[20. The front panel according to claim 19, wherein a dielectric is formed to cover a second part of said main surface of said substrate, said transparent electrode and said bus electrode, wherein said dielectric comprises a plurality of dielectric layers with different softening points.]

*21. A plasma display panel comprising:*

*a first substrate;*

*a second substrate provided to face said first substrate, with a plurality of discharge cells filled with a discharge gas between said first substrate and said second substrate;*

*a pair of display electrode lines formed on an opposing surface of said first substrate opposing to said second substrate;*

*another pair of display electrode lines adjacent to said pair of display electrode lines and formed on said opposing surface of said first substrate; and*

*a black stripe portion comprising a black dielectric layer and formed on a part of said opposing surface of said first substrate: in an interval between said pair of display electrode lines and said another pair of display electrode lines,*

*wherein said black stripe portion further comprises a first white dielectric layer formed on a surface of said black dielectric layer.*

*22. A plasma display panel comprising:*

*a first substrate;*

*a second substrate provided to face said first substrate, with a plurality of discharge cells filled with a discharge gas between said first substrate and said second substrate; and*

*a pair of display electrode lines formed on an opposing surface of said first substrate opposing to said second substrate;*

*wherein each of said display electrode lines comprises:*

*a transparent electrode formed on said opposing surface of said first substrate; and*

*a bus electrode formed on a surface of said transparent electrode, wherein said bus electrode comprises a black electroconductive material layer comprising a black electroconductive material and formed on said surface of said transparent electrode,*

*wherein said black electroconductive material layer is formed by using a silver material comprising a black additive, wherein said first substrate comprises*

*a glass substrate formed by a float method in which molten glass is poured out on molten tin, said glass substrate comprising a tin surface and an off-tin surface provided to face said tin surface, and wherein said off-tin surface forms said opposing surface of said first substrate.*

*23. The plasma display panel according to claim 22, wherein said off-tin surface is coated with a coating film.*

*24. The plasma display panel according to claim 22, further comprising:*

*a dielectric formed to cover said pair of display electrode lines and said opposing surface of said first substrate,*

*wherein said dielectric comprises a plurality of dielectric layers having different softening points.*

*25. A front panel for use in a plasma display panel, comprising:*

*a substrate;*

*a black dielectric layer formed in a stripe on a main surface of said substrate;*

*a white dielectric layer formed on a surface of said black dielectric layer; and*

*a pair of display electrode lines and another pair of display electrode lines formed on said main surface of said substrate to be adjacent to each other with said black dielectric layer interposed therebetween.*

*26. The plasma display panel according to claim 22, wherein said glass substrate comprises a soda glass substrate.*

*27. The plasma display panel according to claim 22, wherein said bus electrode further comprises a light-reflecting material layer formed on a surface of said black electroconductive material layer and capable of reflecting visible light.*

*28. A plasma display panel comprising:*

*a first substrate;*

*a second substrate provided to face said first substrate, with a plurality of discharge cells filled with a discharge gas between said first substrate and said second substrate; and*

*a pair of display electrode lines formed on an opposing surface of said first substrate opposing to said second substrate, wherein each of said display electrode lines comprises:*

*a transparent electrode formed on said opposing surface of said first substrate, and*

*a bus electrode formed on a surface of said transparent electrode, wherein said bus electrode comprises:*

*a black electroconductive material layer comprising a black electroconductive material and formed on said surface of said transparent electrode, and*

*a light-reflecting material layer formed on a surface of said black electroconductive material layer and capable of reflecting visible light, wherein said black electroconductive material layer and said light-reflecting material layer are both formed of a thick film material, and wherein said black electroconductive material layer is formed of a first metal material, and said light-reflecting material layer is formed of a second metal material having a particle size smaller than the particle size of said first metal material.*

* * * * *